United States Patent [19]

James

[11] Patent Number: 5,301,170

[45] Date of Patent: Apr. 5, 1994

[54] ULTRASONIC SENSOR MOUNTING DEVICE

[75] Inventor: Richard W. James, Cedar Rapids, Iowa

[73] Assignee: Cedarapids, Inc., Cedar Rapids, Iowa

[21] Appl. No.: 984,367

[22] Filed: Dec. 2, 1992

[51] Int. Cl.$^5$ .................. G01S 15/00; H04R 17/00
[52] U.S. Cl. .................. 367/188; 367/167; 367/172; 367/96
[58] Field of Search ............. 367/167, 172, 902, 188, 367/99, 96; 404/84.05, 84.5

[56] References Cited

U.S. PATENT DOCUMENTS

| | | | |
|---|---|---|---|
| 4,130,018 | 12/1978 | Adams et al. | 367/902 |
| 4,524,693 | 6/1985 | McMahon et al. | 367/172 |
| 4,872,148 | 10/1989 | Kirby et al. | 367/172 |
| 4,933,853 | 6/1990 | Musil et al. | |

*Primary Examiner*—Daniel T. Pihulic
*Attorney, Agent, or Firm*—Simmons, Perrine, Albright & Ellwood

[57] ABSTRACT

A device for mounting an ultrasonic transducer on user equipment for operation in a contaminating, ambient environment. A housing has a forwardly extending, profiled inner surface for promoting focusing along an axis of ultrasonic waves emitted by a transducer mounted against a shoulder of the casing. A chamber adjacent to a backside of the transducer is formed by a rearwardly extending portion of the casing and a cap forming an overlap portion therewith. A bladder disposed in the chamber has a port which vents into the overlap portion such that pressure equalization across the transducer is dynamically maintained. A calibrator offset by known displacement from the transducer provides a reflected wave portion to the transducer such that errors caused by temperature dependency of the velocity of propagation of the ultrasonic waves through the ambient environment can be substantially eliminated.

9 Claims, 1 Drawing Sheet

ULTRASONIC SENSOR MOUNTING DEVICE

BACKGROUND OF THE INVENTION

1. Field of the Invention

The present invention relates to a device for mounting an ultrasonic sensor on equipment for use in a harsh environment and particularly for mounting an ultrasonic transducer on asphalt paving equipment for ranging and control applications.

2. Description of the Related Art

Ultrasonic transducers and sensors have been utilized for a variety of applications, including ranging applications for controlling quantity of asphalt aggregate in an augered hopper and thickness control of asphalt being laid on a road bed, and other widely differing applications. Unfortunately, several drawbacks exist for use of ultrasonic transducers in the largely uncontrolled, ambient environment in which many of the transducers are used.

For example, an ultrasonic transducer used for ranging in asphalt paving applications is subjected to repeated heating and cooling cycles, due to the nature of those particular applications. As a result of such repeated heating and cooling cycles, moisture from the ambient atmosphere tends to condense and collect on the back side of the transducer. Over time, sufficient moisture and contamination resulting therefrom have collected on the back side of the transducer such that the performance of the transducer becomes erratic, usually followed by total failure thereof. This problem is particularly pronounced during periods of high humidity, such as during rains storms.

It would appear that this problem could be overcome by hermetically sealing the back side of the transducer, thus isolating it from the moisture and contaminants of the ambient atmosphere. Such an approach, however, introduces a new problem. As the temperature of the gaseous medium trapped within the hermetically sealed enclosure changes, the medium attempts to expand or contract accordingly, due to the inherent thermal expansion characteristics of the medium. As a result, the pressure on the back side of the transducer within the hermetically sealed enclosure differs from the pressure on the opposing side or emitting face of the transducer. Unfortunately, the accuracy and efficiency of the transducer is dependent upon the maintenance of minimal or zero differential pressures between the face and back side thereof. In turn, the solution to this pressure differential problem would appear to be solvable by venting the back side of the transducer to the ambient atmosphere, which goes full circle to the problems hereinbefore described.

Various approaches have been utilized in an attempt to alleviate the aforementioned problems, such as by venting through a signal cable connected to the transducer or other circuitous routing, desiccants, and the like. Unfortunately, these prior attempts have met with only limited or no success.

Another potential problem which exists during use of ultrasonic transducer arises from the temperature dependency of the velocity of propagation of the ultrasonic waves through the ambient atmosphere. This problem particularly exists for the elevated temperatures normally involved in asphalt paving applications. In addition, for asphalt paving applications, the temperature of the atmosphere through which the waves traverse is constantly changing, particularly when a breeze or gusty wind is present.

One approach for reducing the inaccuracies generated by the elevated temperatures is to impose a minor obstruction of known distance from the transducer which reflects a calibrating signal or echo. The transit time of ultrasonic waves associated with the calibrating echo can be compared with the transit time of ultrasonic waves reflected from a target surface. Assuming the temperature characteristics for each of the paths for the waves generating the calibrating signal and target signal are identical, then the temperature dependency of the velocity of propagation of the ultrasonic waves along their respective paths can conceivably be eliminated. Many such applications using this approach, however, space the minor obstruction within a somewhat protected enclosure, such as within a sleeve extending forwardly from the emitting face of the transducer. Such an arrangement generally prevents the temperature characteristics of the path of the ultrasonic waves generating the calibrating signal from matching those of the path of the ultrasonic waves generating the target signal, particularly during breezy or gusty conditions.

What is needed is a mounting device which protects an ultrasonic sensor or transducer from moisture and contaminants without causing a pressure differential thereacross and which substantially or entirely eliminates temperature dependency of the velocity of propagation of the ultrasonic waves, including uses in breezy or gusty conditions.

SUMMARY OF THE INVENTION

An improved mounting device is provided for mounting an ultrasonic sensor or transducer on user equipment for operation in an ambient environment containing moisture or other contaminants. The mounting device includes a transducer having a face for emitting and receiving ultrasonic waves and a housing for mounting the transducer therein. The housing includes a casing having a front end and a rear end disposed about a longitudinal axis. A shoulder, disposed intermediately between the front and rear ends and generally transversely to the longitudinal axis, is adapted to bear against a rim of the transducer as the transducer is mounted in the casing. The casing has an inner surface extending from near the shoulder to the front end, with the inner surface having a shaped profile about the axis in order to promote focusing of the ultrasonic waves along the longitudinal axis.

The housing also includes a cap which is adapted to provide an overlap portion between the cap and the casing, such that a chamber is provided adjacent to the backside of the transducer. The cap is dimensioned such that air can pass through the overlap portion between the cap and the casing, but such that dust and other contaminants cannot pass therebetween. The cap is constructed of a material having a thermal coefficient of expansion substantially similar to that of the casing. The casing also has an orifice which is adapted to communicate between the overlap portion and the chamber.

A spacer is provided which simultaneously bears against the transducer and the cap as the transducer bears against the shoulder of the casing. A first or device gasket is spaced between the transducer and the shoulder such that an environmentally-tight, impervious seal is provided between the transducer and the shoulder. Similarly, a second or cap gasket is spaced between the cap and the casing such that an environmentally-tight, impervious seal is provided between the cap and the casing.

The ultrasonic sensor mounting device includes a bladder disposed within the chamber. The bladder has an input port spaced within the orifice with the input port opening into the overlap portion. A plug disposed in the input port is adapted to provide an impervious seal between the bladder and the orifice. The plug is porous such that air can freely pass between the bladder and the overlap portion, thereby minimizing or eliminating a tendency for differential pressure to be formed across the transducer.

A calibrator is spaced a desired distance from the face of the transducer and exteriorly to the casing such that a reflected portion of the ultrasonic waves emitted by the transducer are echoed back to the transducer in addition to those reflected by a target surface.

OBJECTS AND ADVANTAGES OF THE INVENTION

Therefore, the principal objects and advantages of the present invention include: providing a mounting device for an ultrasonic sensor o transducer that prevents moisture from condensing on the transducer; providing such a mounting device that minimizes or eliminates differential pressures across the transducer; providing such a mounting device with a bladder adapted to minimize or eliminate pressure differential across the transducer; providing such a mounting device wherein such a bladder is protected from damage due to handling; providing such a mounting device with a calibrator for dynamically eliminating errors caused by temperature dependency of the velocity of propagation of the ultrasonic waves through the ambient atmosphere; providing such a mounting device which is particularly applicable to asphalt paving applications, including those conducted in breezy or gusty conditions; and generally providing such a mounting device which is efficient and reliable, economical to manufacture, simple to maintain, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figures 1, 2, 3, 4:
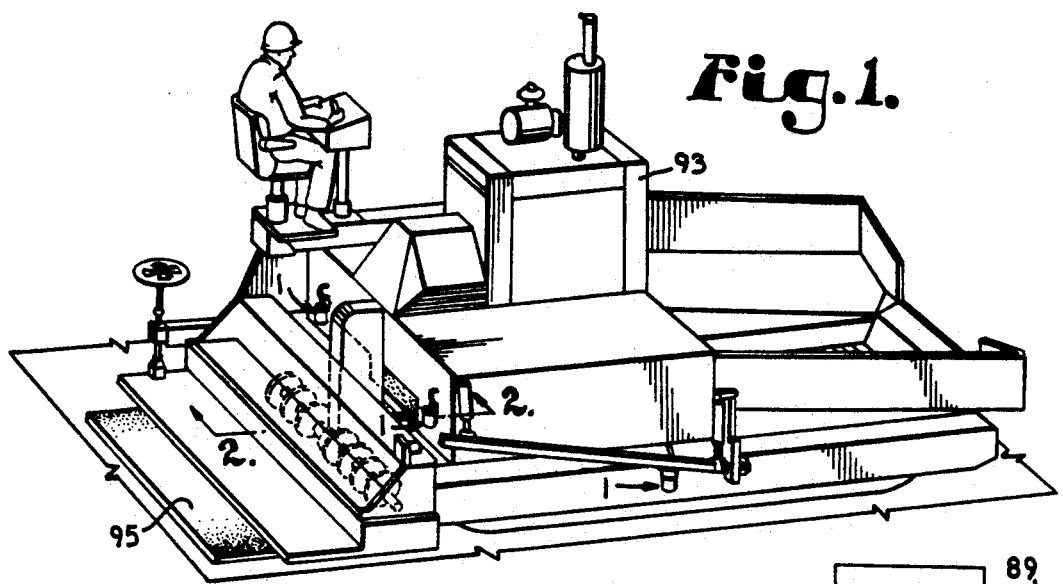
FIG. 1 is a perspective view of a plurality of ultrasonic sensor mounting devices shown with an asphalt paving machine in accordance with the present invention.
FIG. 2 is an enlarged, side elevational view of the ultrasonic sensor mounting device, taken generally along line 2—2 of FIG. 1, showing a calibrator thereof and shown with an augered hopper of the asphalt paving machine.
FIG. 3 is a further enlarged, longitudinal cross-sectional view of the ultrasonic sensor mounting device, taken generally along line 3—3 of FIG. 2.
FIG. 4 is a further enlarged, transverse cross-sectional view of the ultrasonic sensor mounting device, taken generally along line 4—4 of FIG. 3, in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to an ultrasonic sensor mounting device in accordance with the present invention, as shown in FIGS. 1 through 4. The device 1 includes mounting means 2 including a housing 3 for mounting an ultrasonic sensor or transducer 5, focusing means 7, protecting means 9 for protecting the transducer 5, pressure equalizing mean 11 for dynamically equalizing differential pressures across the transducer 5, and calibrating means 13 for dynamically eliminating errors caused by temperature dependency of the velocity of propagation of ultrasonic waves 15 emitted and received by the transducer 5.

The housing 3 generally includes a casing 21, having a front end 23 and a rear end 25. Generally, the casing 21 has a cross-sectional profile which is shaped similarly to that of the transducer 5. Thus, for a circularly shaped transducer 5, the casing 21 is generally cylindrically shaped about an axis A—A, as shown in FIG. 3. The casing 21 generally has a shoulder 27, which is disposed intermediately between the front end 23 and the rear end 25 and which is oriented transversely to the axis A—A. The shoulder 27 is adapted to bear against a rim 29 of the transducer 5 as the transducer 5 is mounted in the casing 21 as described herein.

The focusing means 7 generally comprise extending the casing 21 forwardly from the shoulder 27, as shown in cross-section in FIG. 3, such that an inner surface 35 is generally provided from near the shoulder 27 to the front end 23. The inner surface 35 is generally profiled with a configuration which promotes focussing of the ultrasonic waves 15 emitted by the transducer 5 along the axis A—A, such as a parabolic, exponential, or other suitable configuration.

In addition to the extension of the casing 21 forwardly from the transducer 5 and in order to distance the transducer 5 from possible physical damage to the transducer 5, the protecting means 9 also generally includes extending the casing 21 rearwardly from the shoulder 27, as shown in cross-section in FIG. 3. Further, the protecting means 9 generally includes a cap 37 as hereinafter described for protecting a backside 39 of the transducer 5 from adverse elements of the environment.

The cap 37 is adapted to be telescoped over the rear end 25 of the casing 21 such that an overlap portion 41 is provided between the cap 37 and the casing 21. Thus, a chamber 47 is provided adjacent to the backside 39 of the transducer 5. The spacing between the casing 21 and the cap 37 at the overlap portion 41 is dimensioned such that air can pass between the casing 21 and the cap 37, but such that dust cannot pass therebetween. The cap 37 is generally constructed of a material having a thermal coefficient of expansion substantially similar to that of the material of the casing 21. For example, both the cap 37 and the casing 21 may be constructed of aluminum or other suitable material. The casing 21 also incudes an orifice 49 which is adapted to provide communication between the overlap portion 41 and the chamber 47.

A spacer 51 is adapted to simultaneously bear against both the backside 39 of the transducer 5 and the cap 37 as the transducer 5 bears against the shoulder 27. A device gasket 57 is generally disposed between the transducer 5 and the shoulder 27 to provide a continuous seal therebetween. Similarly, a cap gasket 59 is generally disposed between the cap 37 and the casing 21 to provide a continuous seal therebetween.

Fastening means, such as a plurality of machine screws 61, are adapted to connect the cap 37 to the casing 21 such that environmentally-tight or impervious seals are provided between the transducer 5 and the shoulder 27 by the device gasket 57 and between the cap 37 and the casing 21 by the cap gasket 59 as the machine screws 61 are tightened, urging the cap 37 against the spacer 51.

The pressure equalization means 11 generally include a bladder 69 disposed within the chamber 47. The bladder 69, which is constructed of suitable flexible material, has an input port 71 spaced within the orifice 49. The input port 71 opens into the overlap portion 41 between the cap 37 and the casing 21. A plug 73 is disposed within the input port 71 such that an environmentally tight and impervious seal is provided between the bladder 69 and the orifice 49. The plug 73 is porous, such that a cavity 75 of the bladder 69 communicates with the overlap portion 41. With the arrangement as described, the bladder 69 provides a means whereby the volume of air inside the chamber 47 can expand or contract as the temperature changes without causing a pressure differential across the transducer.

A slot 77 is generally provided in the spacer 51 to facilitate placement of the input port 71 in the orifice 49. Also, the slot 77 may open toward the cap 37, as show in FIG. 3, or, alternatively, may open toward the transducer 5 to facilitate removal of the spacer 51.

The calibrating means 13, such as a rod 81 oriented generally transversely relative to the axis A—A, is spaced such that the ultrasonic waves 15 emitted by the transducer 5 impinge thereon and a reflected portion 83 of the longitudinal waves 15 emitted by the transducer 5 is echoed back to the transducer 5. For example, the rod 81 may have a ¼ inch diameter and be spaced approximately 6-8 inches from the transducer 5. Note that the rod 81 can be spaced off-center from axis A—A if desired, as shown in FIG. 3. By spacing the calibrator 81 a known distance from the transducer 5, any change in transit time due to change in the velocity of propagation of the ultrasonic waves 15 through the ambient environment, such as that resulting from temperature dependency, can be minimized or eliminated from the waves 84 reflected from a surface 85 which is the object of one of the applications of the invention 1.

Conductors 86 interconnect the transducer 5 with a connector 87 for connecting the transducer 5 to sensor equipment 89, such as control and monitor equipment commonly available in the industry. It is to be understood that, alternatively, the connector 87 can be disposed on a side of the casing 21 to facilitate unhindered removal of the cap 37, or other suitable location, if desired.

The mounting means 2 also include clamping means 91, which are provided to affix the device 1 to associated equipment 93, such as a paving machine or other application.

In an application of the present invention, the sensor equipment 89 is activated such that the transducer 5 emits ultrasonic waves 15. The rod 81 is offset from the transducer 5 such that the spacing between the rod 81 and the front end 23 represents a substantial fraction of the spacing between the front end 23 and the target surface 85, such as a road bed beneath the paving machine 93 for controlling thickness of asphalt paving 95 being laid therebeneath, or a surface 96 of asphalt aggregate 97 in a hopper 98 for volume control, or other application as desired.

As a result of the spacing between the rod 81 and the front end 23, temperature variations along the paths from emission to reception of the reflected portion 83 are substantially similar to those experienced by a target portion 84 of the ultrasonic waves 15 which are reflected by the target surface 85 even under breezy or gusty conditions. Thus, by causing the transducer 5 to emit a square-type transmission and comparing the transit time from emission to reception of the reflected portion 83 with the transit time from emission to reception of the target portion 84, the temperature dependency of the velocity of propagation of the ultrasonic waves 15 through the ambient environment can be substantially minimized or entirely eliminated, thus providing enhanced accuracy by use of the device 1 for ranging purposes.

It is to be understood that while certain forms of the present invention have been illustrated and described herein, it is not to be limited to the specific forms or arrangement of parts described and shown.

What is claimed and desired to be secured by Letters Patent is as follows:

1. A mounting system for mounting an ultrasonic transducer on user equipment for operation in an ambient environment containing contaminants including moisture and for controlling distance from a target surface, wherein the transducer has a face which emits and receives ultrasonic waves, said mounting system comprising:
  (a) mounting means for mounting the transducer;
  (b) focusing means for focusing the ultrasonic waves emitted and received by the transducer;
  protecting means for protecting the transducer from the contaminants;
  (d) pressure equalizing means for dynamically equalizing pressure across the transducer; and
  (e) calibrating means for substantially and dynamically eliminating errors caused by temperature dependency of the velocity of propagation of the ultrasonic waves emitted and received by the transducer; said calibrating means include a calibrator spaced such that a reflected portion of the ultrasonic waves emitted by the transducer is echoed back to the transducer; said calibrator spaced apart from said focuser such that the spacing between said calibrator and said focusing means is a substantial fraction of the spacing between said focusing means and the target surface.

2. The mounting system according to claim 1, wherein:
  (a) said calibrator is spaced approximately six to eight inches from the transducer.

3. The mounting system according to claim 1, wherein:
  (a) said calibrator is a rod spaced generally transversely relative to the ultrasonic waves emitted by the transducer.

4. The mounting system according to claim 3, wherein:

(a) said rod is cylindrically shaped and has a diameter of approximately ¼ inch.

5. A mounting mechanism for a transducer having a back side and a face surrounded by a rim wherein the face is adapted to emit and receive ultrasonic waves, said mounting mechanism comprising:

(a) a housing including:
(1) a casing having a longitudinal axis, a front end, a rear end, and a shoulder disposed intermediately to said front and rear ends and generally transversely to said axis; said shoulder adapted to bear against the rim of the transducer as the transducer is mounted in said casing; said casing having an inner surface generally extending from said shoulder to said front end; said inner surface having a shaped profile which is adapted to promote focusing of the waves emitted by the transducer along said longitudinal axis;
(2) a cap adapted to provide an overlap portion between said cap and said casing and to provide a chamber adjacent to the back side of the transducer; said overlap portion dimensioned such that air can pass therethrough but such that dust cannot pass therethrough; said cap constructed of a material having a thermal coefficient of expansion substantially similar to that of said casing;
(3) an orifice adapted to communicate between said overlap portion with said chamber;
(4) a spacer adapted to simultaneously bear against the transducer and said cap as the transducer bears against said shoulder;
(5) a first gasket spaced between the transducer and said shoulder;
(6) a second gasket spaced between said cap and said casing; and
(7) at least one fastener adapted to connect said cap to said casing such that impervious seals are provided between the transducer and said shoulder by said first gasket and between said cap and said casing by said second gasket;

(b) a bladder disposed within said chamber; said bladder having an input port spaced within said orifice; said input port opening into said overlap portion;

(c) a porous plug disposed in said input port such that an impervious seal is provided between said bladder and said orifice; and (d) a calibrator spaced a selected distance from the face of the transducer; said calibrator disposed such that a reflected portion of the ultrasonic waves emitted by the transducer are echoed back to the transducer.

6. A mounting system for mounting an ultrasonic transducer on user equipment for operation in an ambient environment containing contaminants including moisture, wherein the transducer has a face which emits and receives ultrasonic waves, said mounting system comprising:

(a) mounting means for mounting the transducer;
(b) focusing means for focusing the ultrasonic waves emitted and received by the transducer;
(c) protecting means for protecting the transducer from the contaminants; said protecting means includes a housing for enclosing the transducer except for the face thereof; said housing includes a casing and a cap fitting thereabout; said cap adapted to cooperatively form an overlap portion with said casing such that air can pass through said overlap portion but dust cannot pass through said overlap portion; said casing and said cap constructed of materials having similar thermal coefficients of expansion; said casing and cap are adapted to provide a sealed chamber adjacent to the transducer; and
(d) pressure equalizing means for dynamically equalizing pressure across the transducer; said pressure equalizing means include a flexible bladder disposed in said chamber; said bladder having an input port opening into said overlap portion.

7. A mounting system for mounting an ultrasonic transducer on user equipment for operation in an ambient environment containing contaminants including moisture, wherein the transducer has a face which emits and receives ultrasonic waves, said mounting system comprising:

(a) mounting means for mounting the transducer;
(b) focusing means for focusing the ultrasonic waves emitted and received by the transducer; said focusing means include a focuser extending outwardly from and generally perpendicularly to the face of the transducer, said focuser being generally cylindrically shaped; said focuser has an inner surface that is profiled such that focussing of the waves emitted by the transducer is promoted thereby;
(c) protecting means for protecting the transducer from the contaminants; said protecting means includes a housing for enclosing the transducer except for the face thereof; said housing includes a casing and a cap fitting thereabout; said cap adapted to cooperatively form an overlap portion with said casing such that air can pass through said overlap portion but dust cannot pass through said overlap portion; said casing and said cap constructed of materials having similar thermal coefficients of expansion; and
(d) pressure equalizing means for dynamically equalizing pressure across the transducer.

8. A mounting system for mounting an ultrasonic transducer on user equipment for operation in an ambient environment containing contaminants including moisture, wherein the transducer has a face which emits and receives ultrasonic waves, said mounting system comprising:

(a) mounting means for mounting the transducer;
(b) focusing means for focusing the ultrasonic waves emitted and received by the transducer; said focusing means include a focuser extending outwardly from and generally perpendicularly to the face of the transducer, said focuser being generally cylindrically shaped; said focuser has an inner surface that is profiled such that focussing of the waves emitted by the transducer is promoted thereby; said inner surface of said focuser has a parabolic configuration;
(c) protecting means for protecting the transducer from the contaminants; and
(d) pressure equalizing means for dynamically equalizing pressure across the transducer.

9. A mounting system for mounting an ultrasonic transducer on user equipment for operation in an ambient environment containing contaminants including moisture, wherein the transducer has a face which emits and receives ultrasonic waves, said mounting system comprising:

(a) mounting means for mounting the transducer;
(b) focusing means for focusing the ultrasonic waves emitted and received by the transducer; said focusing means include a focuser extending outwardly from and generally perpendicularly to the face of the transducer, said focuser being generally cylindrically shaped; said focuser has an inner surface that is profiled such that focussing of the waves emitted by the transducer is promoted thereby; said inner surface of said focuser has an exponential configuration;
(c) protecting means for protecting the transducer from the contaminants; and
(d) pressure equalizing means for dynamically equalizing pressure across the transducer.

* * * * *